United States Patent Office 3,105,511
Patented Oct. 1, 1963

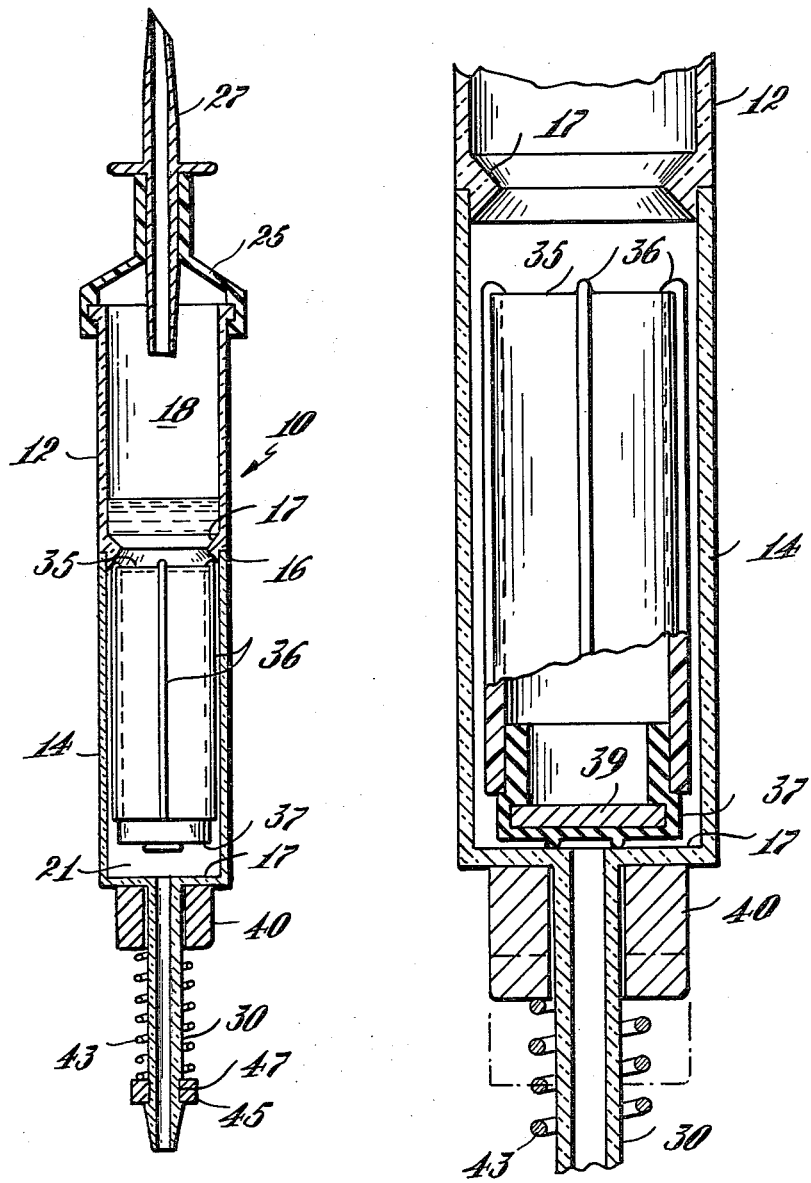

3,105,511
INFUSION SAFETY VALVE
William P. Murphy, Jr., Miami, Fla., assignor to Cordis Corporation, Miami, Fla., a corporation of Florida
Filed Aug. 10, 1961, Ser. No. 130,682
4 Claims. (Cl. 137—399)

This invention relates to vascular injection techniques for medical purposes and involves more particularly a safety valve for preventing the entry of air into a patient's circulatory system.

During various medical procedures such as cardiac catheterization, it is necessary to maintain a flow of a compatible liquid into some part of a patient's vascular system. Typically a bottle containing the liquid is provided with a source of air under pressure for driving the flow. With such a system, however, the danger exists that if the bottle is completely emptied of fluid, the compressed air will pass into the patient's circulatory system with certain dire consequences such as an embolism.

Objects of the invention accordingly are to provide a safety valve for preventing the passage of gas through a vascular injection system, to provide such a valve which is quick and reliable in action, which facilitates the proper operation of the injection system with which it is associated, which can be reopened only by direct manual operation, which is easily cleaned, which is easily operable, and which is of relatively simple and inexpensive construction.

In its characteristic aspects a valve according to the invention involves an elongate housing having at its upper end an inlet and at its lower end an outlet. Sliding freely within the housing there is a float having at its lower end seal means for closing the outlet when the level of liquid within the housing falls below a predetermined level. Preferably, there is a first magnetic element attached to the float at its lower end and a second magnetic element connected to the housing operationally adjacent the outlet whereby once the valve closes the magnetic attraction between the two magnetic elements is sufficient to prevent the buoyancy of the float from reopening the outlet. Preferably also, the second magnet element is spring mounted so that it can be manually displaced from the outlet thereby permitting the outlet to be reopened.

In a practically important embodiment the valve is constructed in very compact combination with a visual drip whereby the rate of flow through the injection system can be observed.

For purposes of illustration a preferred embodiment of the present invention is shown in the accompanying drawing in which:

FIG. 1 is a plan view in section of an infusion safety valve; and

FIG. 2 is a similar view to a larger scale with additional parts being broken away.

Referring now to the drawings the valve housing 10 is constructed of transparent plastic and is made in two parts 12 and 14 which are joined in end-to-end relation at a snug fitting, sealed joint 16. An internal flange 17 at this joint divides the housing 10 into two chambers, an upper, drip chamber 18 and a lower, float chamber 21. Fitting over the upper end of the housing part 12 is a rubber cap 25 through which extends a tubular inlet spike 27. The lower housing part 14 is closed at its lower end by a wall member 17 having extending therefrom an outlet tube 30. Loosely fitting within this housing part 14 there is provided a hollow float 35 having at its lower end a rubber valve seal 37. The float is ribbed as at 36 so as not to block the flow of liquid through the housings. Fitting within an internal groove in the rubber seal is an iron disc 39 (FIG. 2). A ring shaped magnet 40 is operationally held against the side of the housing end wall 17 opposite the valve seal 37 by a coil spring 43 whose opposite end bears against a split ring stop 45 set in a groove 47 in the outlet tube 30.

The typical operation of the device is as follows. The upper end of the spike 27 is inserted into the stopper of a bottle of intravenous fluid and the outlet tube 30 is connected by means of suitable flexible tubing to a catheter or other means for connection to the patient's circulatory system. During normal operation the liquid level within the valve housing 10 is maintained above the flange 17 and the rate of flow of fluid can be gauged by observing the drip of fluid from the lower end of the spike 27. If, however, the supply of fluid becomes exhausted and the liquid level falls substantially below the flange 17, the float 35 will drop within the housing until the valve seal 37 engages the housing end wall 17 thereby closing off the outlet 30 and preventing the harmful passage of air into the patient's circulatory system. Because of the nearby presence of the magnet 40 the force available for sealing off the outlet 30 is not limited to the weight of the float 35 but rather includes the attraction between the magnet 40 and the iron disc 39 within the rubber seal 37.

Preferably the strength of the magnet 40 is predetermined so that the magnetic attraction exerted on the iron disc 39 not only aids in closing the valve but also is sufficient, when the valve is closed, to overcome the buoyancy of the float 35 and thereby prevent the reopening of the valve upon the refilling of the housing 10 with liquid. The valve, however, can be reopened manually by drawing the ring shaped magnet 40 downwardly against the force of the spring 43 to the position shown in dot-dash line in FIG. 2 so that the magnetic attraction exerted on the disc 39 is reduced to a value insufficient to overcome the buoyancy of the float 35. By this means a continuing warning is provided that the valve housing 10 has been emptied of fluid and that there exists the possibility of air bubbles within the tubing connecting the catheter, the standard procedure then being to bleed the tubing upon reopening the valve.

This same feature also provides a similar warning in the case in which an empty bottle is being replaced by a full one. To make the change over the empty bottle with the attached valve housing 10 must be inverted in order to transfer the spike 27 from the one bottle to the other. For this purpose it is preferable that the strength of the magnet 40 also be such that, in the absence of any buoyancy in either direction, it can lift the weight of the float 35. In this way when the fresh bottle is reinverted the valve must be manually reopened thereby again giving warning to bleed the associated tubing.

It should be understood that this disclosure is for the purpose of illustration only and that the present invention includes all modifications and equivalents falling within the scope of the appended claims.

I claim:

1. An infusion safety valve comprising an elongate housing having at its upper end an inlet and at its lower end an outlet and being otherwise sealed, a float sliding freely within said housing and having at its lower end means for closing said outlet, a first magnetic element attached to said float, a second magnetic element connected to said housing and operationally positioned adjacent said outlet, at least one of said magnetic elements being permanently polarized, the buoyancy of the float being sufficient to maintain separated the two said magnetic elements but insufficient to separate them from close proximity to one another.

2. An infusion safety valve comprising an elongate tubular sealed housing having at its one upper end an inlet and at its other lower end an outlet; a float slidable within said housing and having at its lower end valve seal means for closing said outlet; a first magnetic element attached to said float at its lower end; a second magnetic element, at least one of said two magnetic elements being magnetically polarized; and spring mounting means for resiliently holding said second magetic element adjacent said outlet, the buoyancy of the float being sufficient to maintain said valve seal means in spaced relation from said outlet but insufficient to open said outlet against the force of attraction of said two magnetic elements when said second magnetic element is adjacent said outlet.

3. An infusion safety valve comprising an elongate tubular sealed housing having at its upper end an inlet and at its lower end a tubular outlet which is smaller in diameter than said housing; a float slidable within said housing and having at its lower end valve seal means for closing said outlet; a magnetically permeable member attached to said float near its lower end; a ring-shaped permanent magnet fitting around said tubular outlet; a coil spring concentric with said tubular outlet for urging said magnet upwards against the lower end of said housing, the pull of said magnet against said magnetically permeable member being sufficient to hold said outlet closed against the buoyancy of said float but insufficient to close said outlet when said float is floating with said seal means spaced from said outlet.

4. An infusion safety device comprising an elongate transparent tubular housing having at its upper end a tubular inlet which extends within said housing and at its lower end an outlet; a float slidable within said housing and having at its lower end valve seal means for closing said outlet; a first magnetic element attached to said float at its lower end; means dividing said housing into two vertically interconnected chambers, said float thereby being confined to the lower chamber; a second magnetic element, at least one of said magnetic elements being magnetically polarized; and spring means for resiliently holding said second magnetic element adjacent said outlet, the buoyancy of the float being sufficient to maintain said valve seal means in spaced relation to said outlet but insufficient to open said outlet against the attraction existing between the two said magnetic elements when said second magnetic element is adjacent said outlet; whereby the upper chamber of said housing provides a visible drip for gauging the flow of liquid therethrough and the float prevents any gas from leaving said housing, the outlet being reopenable only by removing said second magnet element from close proximity to said outlet.

References Cited in the file of this patent
UNITED STATES PATENTS

| | | |
|---|---|---|
| 2,691,386 | Madison | Oct. 12, 1954 |
| 2,693,801 | Foreman | Nov. 9, 1954 |
| 2,708,944 | Modine | May 24, 1955 |
| 2,715,488 | Conlon | Aug. 16, 1955 |
| 2,784,733 | Martinez | Mar. 12, 1957 |
| 2,844,147 | Beacham | July 22, 1958 |
| 2,879,784 | Cutter | Mar. 31, 1959 |

FOREIGN PATENTS

| | | |
|---|---|---|
| 592,126 | Canada | Feb. 9, 1960 |
| 744,858 | Great Britain | Feb. 15, 1956 |
| 914,086 | Germany | June 24, 1954 |
| 1,043,125 | Germany | Nov. 6, 1958 |